Feb. 14, 1956  E. O. NORRIS  2,734,479
CENTRIFUGAL SPRAYING COATING APPARATUS
Filed May 14, 1952  6 Sheets-Sheet 1

INVENTOR.
EDWARD O. NORRIS
BY
ATTORNEY

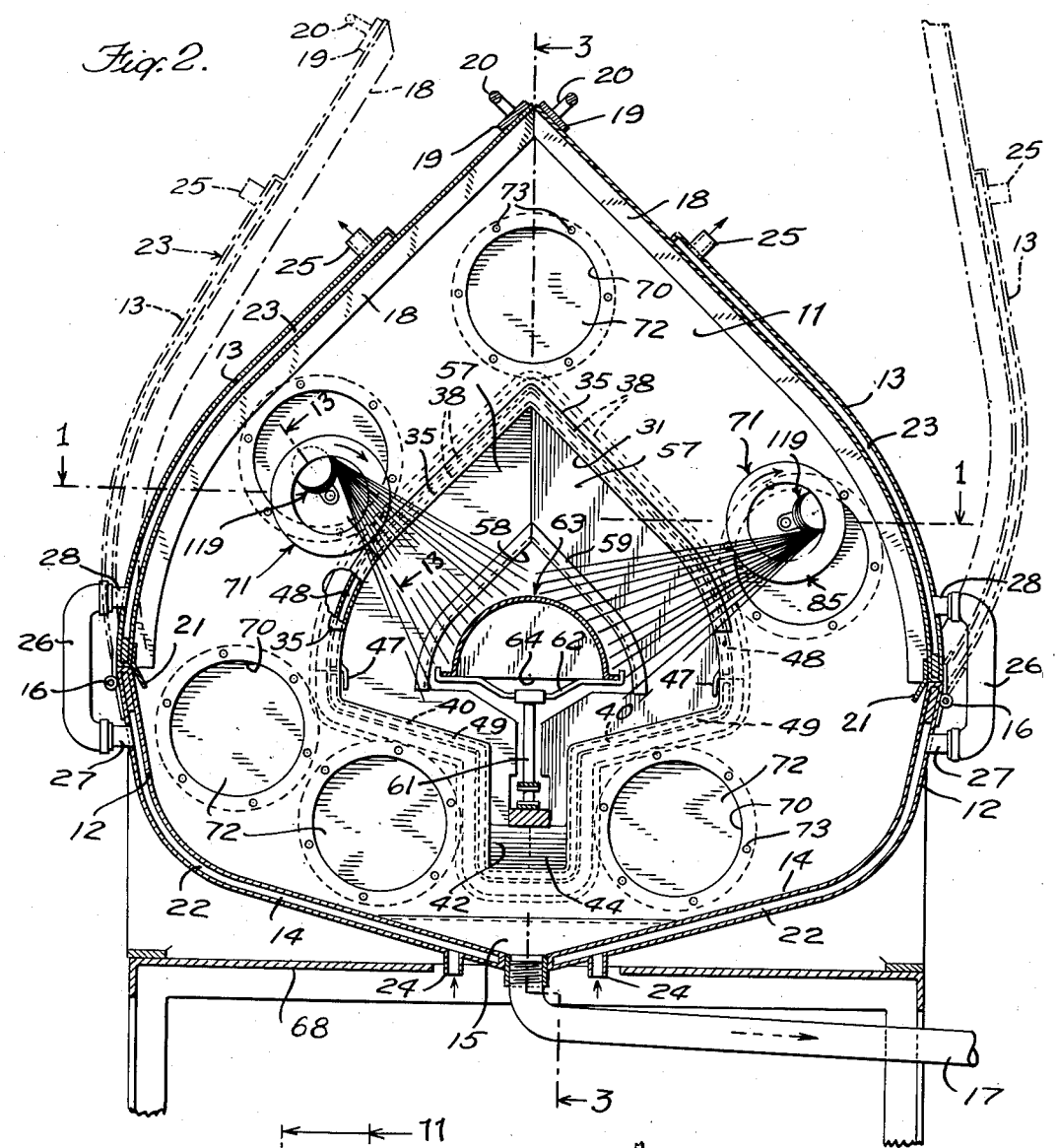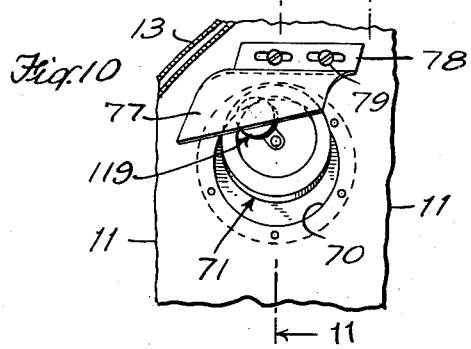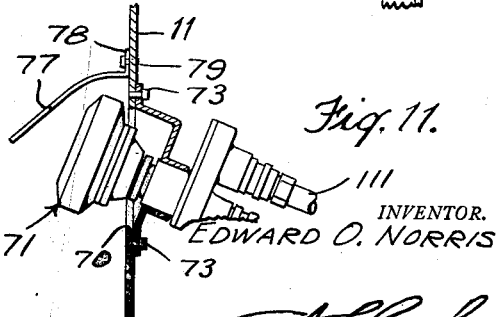

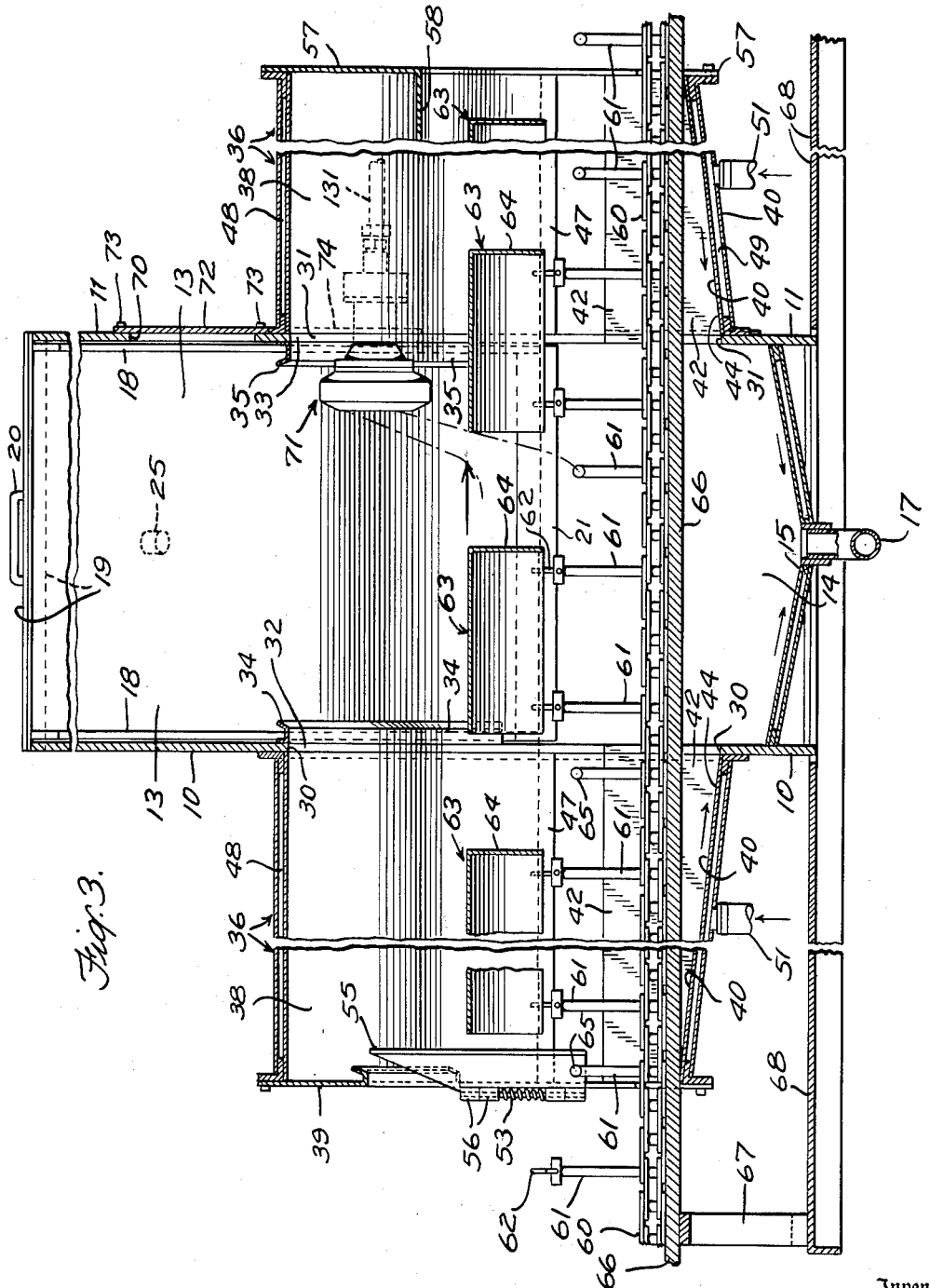

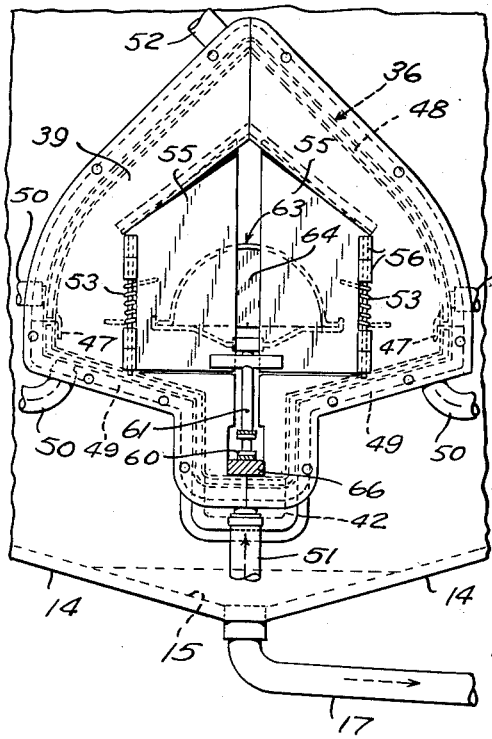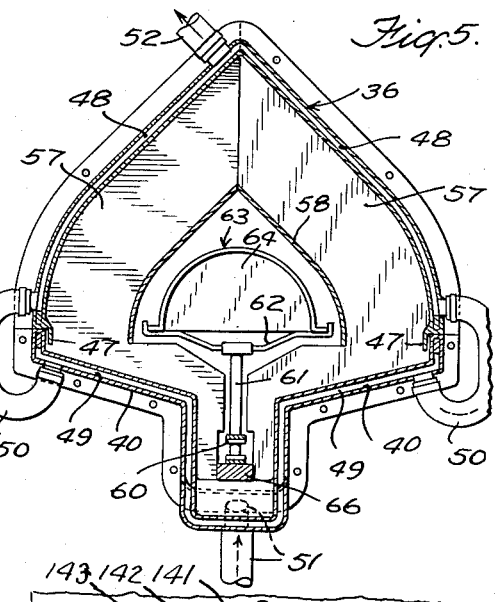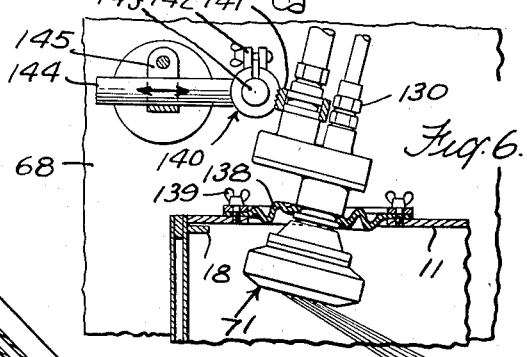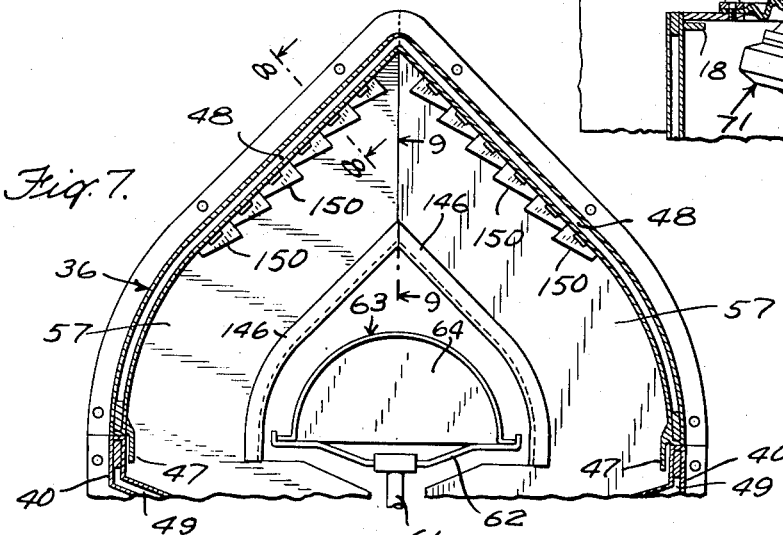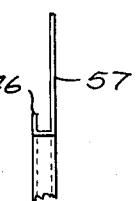

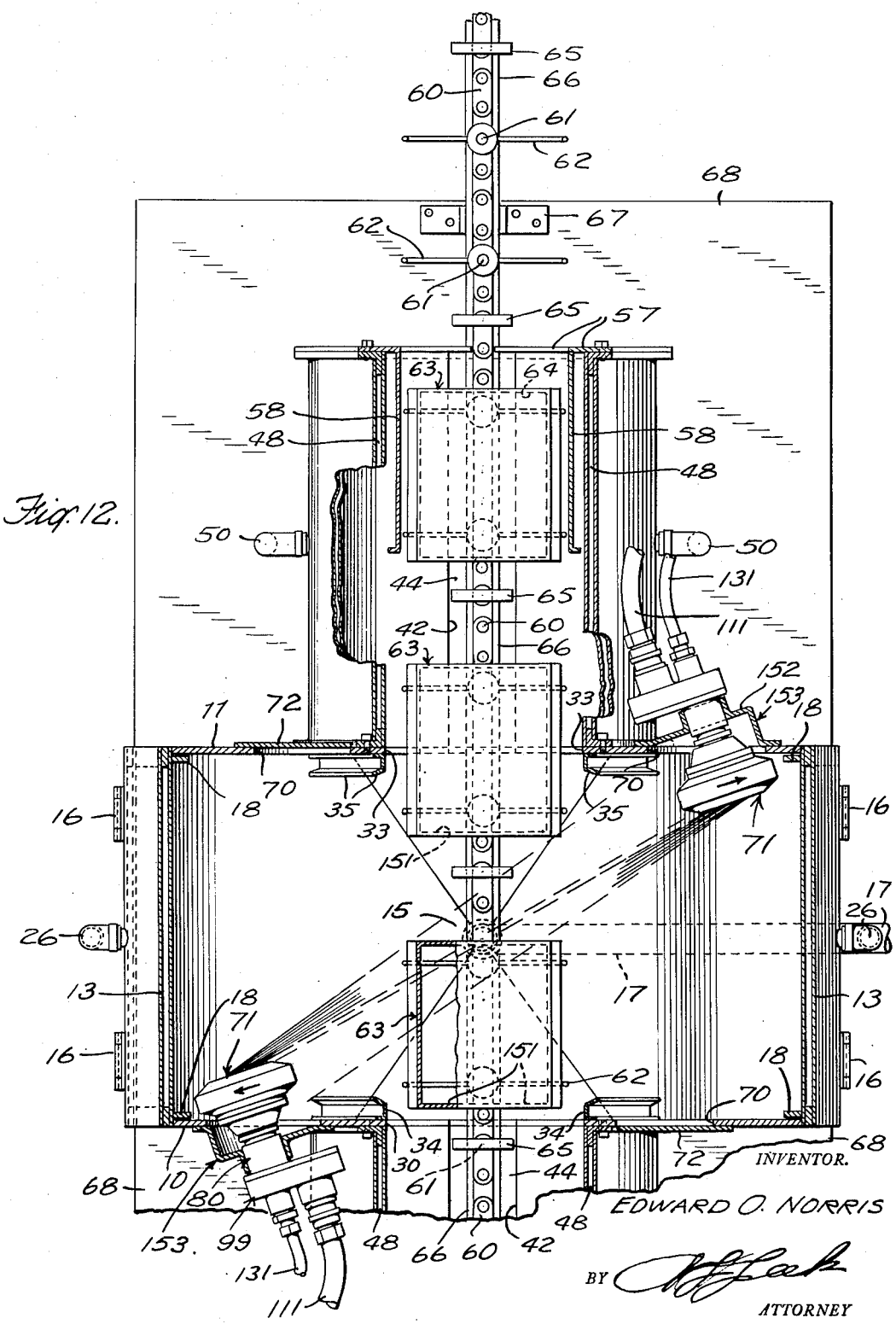

United States Patent Office 2,734,479
Patented Feb. 14, 1956

2,734,479

CENTRIFUGAL SPRAYING COATING APPARATUS

Edward O. Norris, Westport, Conn.

Application May 14, 1952, Serial No. 287,789

5 Claims. (Cl. 118—326)

This invention relates to a method and apparatus for spraying centrifugally objects which are capable of being fed into a spray zone and has for an object to provide a novel and improved method and apparatus of the above type.

Another object is to provide an apparatus of the above type having novel and improved details of construction and features of operation.

Another object is to provide a spraying apparatus wherein a centrifugal sprayer operates in a substantially closed spray zone wherein solvent vapor pressure equilibrium conditions are maintained.

Another object is to prevent separation and removal of the solvent in the spray zone and thereby to maintain the spray material at the desired viscosity.

Another object is to provide a fixed wall enclosure for the spray zone which is so constructed and arranged as to prevent sprayed material which collects on the walls from dripping onto the pieces being sprayed.

Another object is to provide a centrifugal spray gun having no stationary external surfaces on which spray particles can collect.

Another object is to provide a novel and improved apparatus of the above type which is readily adaptable for spraying objects of different sizes or shapes.

Various other objects and advantages will be apparent as the nature of the invention is more fully disclosed.

In accordance with this invention, the articles to be sprayed are fed into or through a stationary housing which is closed except for the openings required for the insertion and removal of the articles and into which centrifugal spray guns project in positions to direct a spray of material onto the articles. The spray guns are of the type having centrifugal distributors and rotary cases and having no stationary external surface on which spray can collect. Hence two or more such spray guns can be used without requiring that each gun be kept out of the direct path of the spray from the others.

The openings in the housing for the passage of the articles to be sprayed are shielded by vestibules which extend along the path of feed of the articles and are of a length to prevent escape of spray or of appreciable amounts of solvent vapor. When required, hinged doors are provided at the outer ends of one or both vestibules which are opened to pass the articles, but normally remain closed to form a substantially tight closure for the spray zone. If the articles to be sprayed are of regular cross section, as in the case of pipe, the vestibules may be closed by flaps which have holes formed therein for the passage of the articles.

In certain embodiments hinged doors may be used on the entrance end where the articles are uncoated and contact with the doors would not injure the surface the exit end may be left open for the passage of the coated articles. The spray gun in that case may be so located as to direct the spray toward the closed entrance end so as to minimize the escape of spray through the open exit end.

A centrifugal spray gun is particularly adapted to use in a closed spray zone as it does not require the admission of large quantities of air into the zone for purposes of atomization. A gun using a centrifugal distributor operating in a rotary collecting case which collects all spray discharged from the distributor except that passing through the spray opening, provides for the useful spraying of substantially all of the spray material fed to the gun. Hence the apparatus is economical of spray material and does not require the feed of large excess quantities thereof.

Since the spray zone is closed against escape of vapors there is no preferential removal of the solvent by evaporation, which would result in thickening of the spray particles so that they would not flow uniformly into the film on the coated surface. The particles are thus maintained in suspension in the proper consistency for uniform coating. The walls of the closure may be heated or cooled by a jacket if desired to maintain the spray zone at a proper temperature for solvent vapor pressure equilibrium conditions.

The features of the invention will be better understood from the following description taken in connection with the accompanying drawings in which specific embodiments have been set forth for purposes of illustration.

In the drawings:

Fig. 2 is a vertical, transverse section taken on the line 2—2 of Fig. 1;

Fig. 3 is a vertical, longitudinal section taken on the line 3—3 of Fig. 2;

Figure 1:
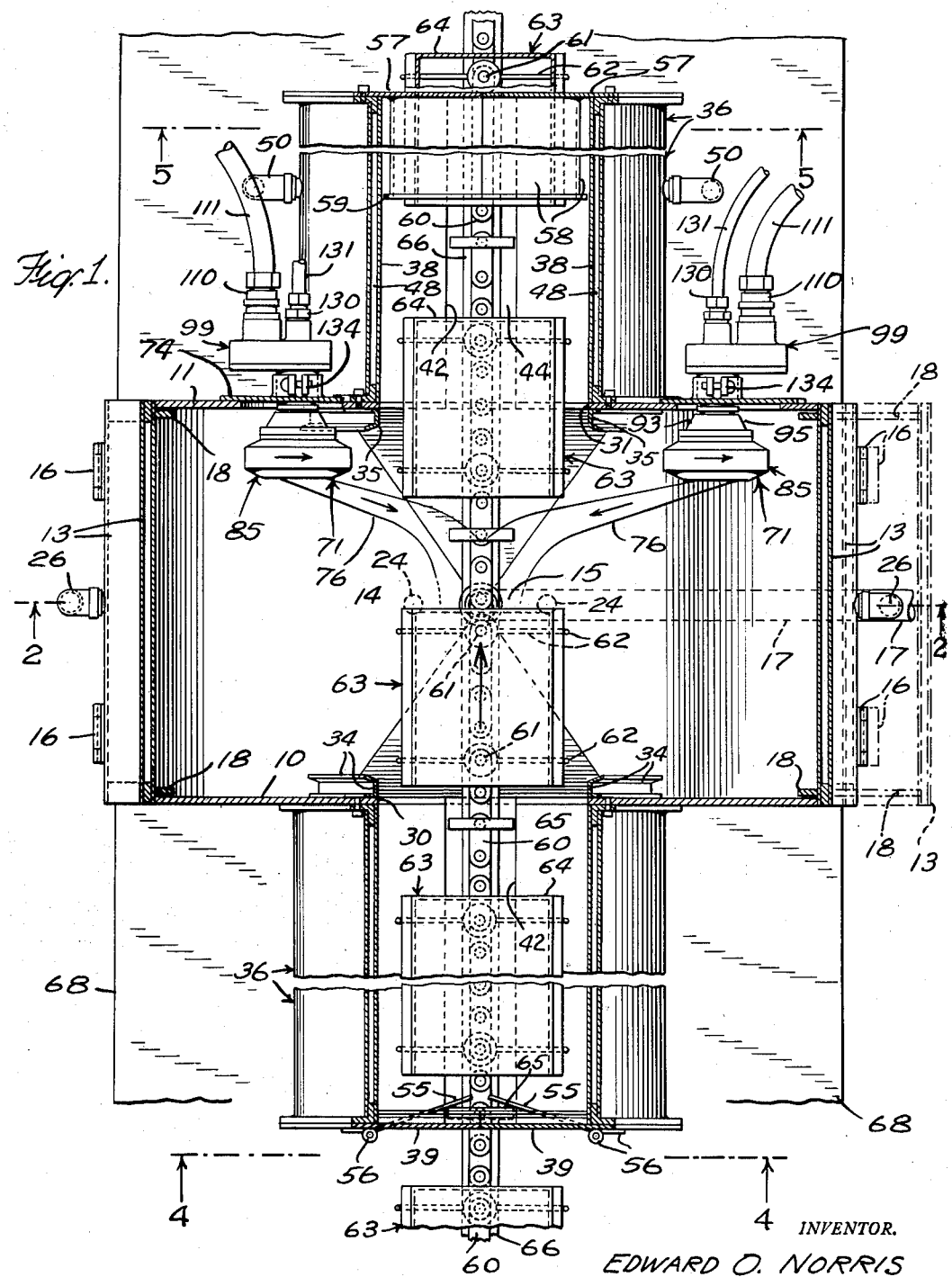
Fig. 1 is a horizontal section taken on the line 1—1 of Fig. 2 showing a spray apparatus embodying the invention.
Figure 13:
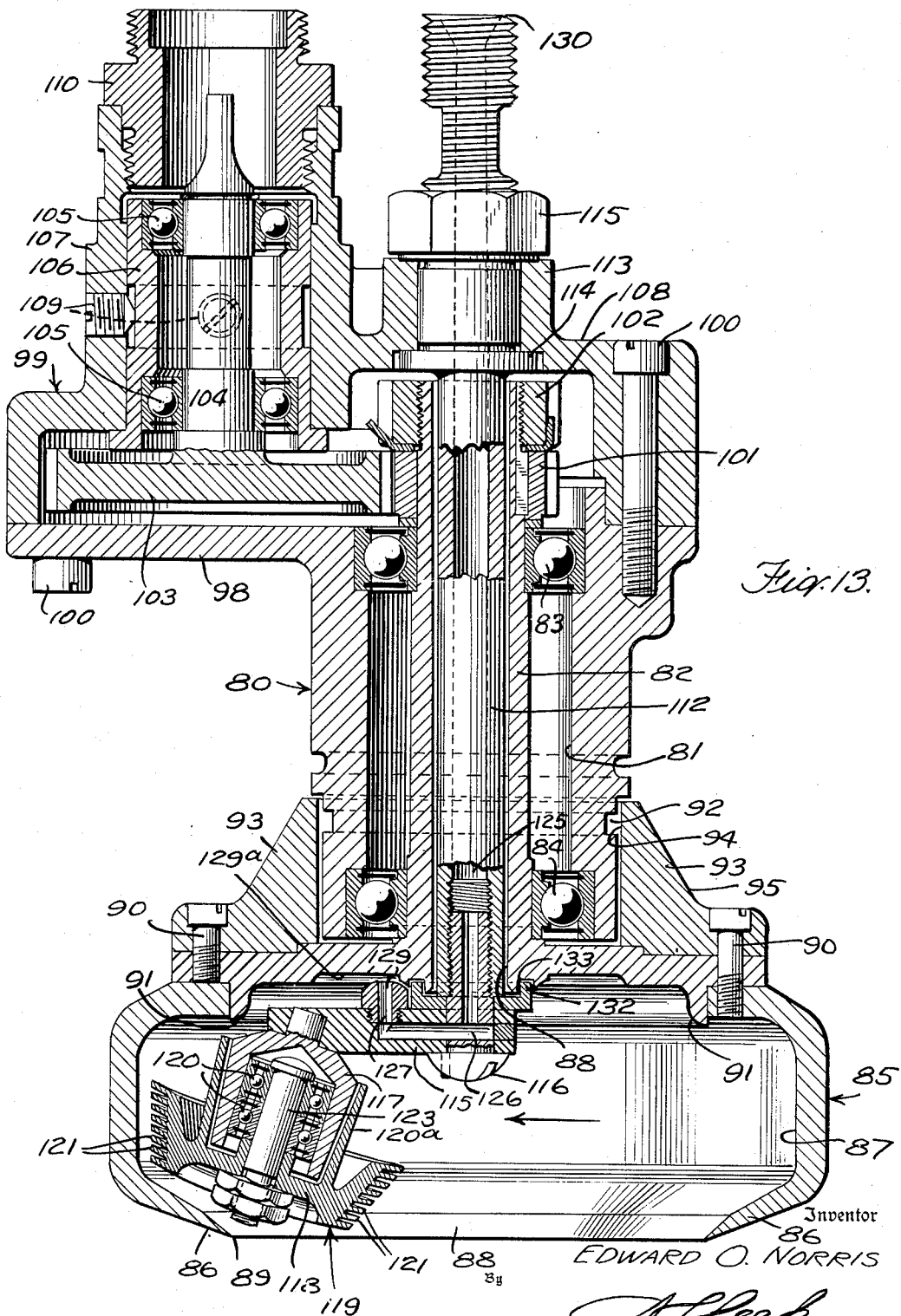

Figs. 4 and 5 are transverse, vertical sections taken on the lines 4—4 and 5—5 respectively of Fig. 1;

Fig. 6 is a partial horizontal section, similar to a portion of Fig. 1, illustrating an adjustable supporting means for the spray gun;

Fig. 7 is a partial, vertical, transverse section, similar to Fig. 5, but on a larger scale illustrating a further embodiment of the invention;

Fig. 8 is a partial section taken on the line 8—8 of Fig. 7;

Fig. 9 is a section taken on the line 9—9 of Fig. 7;

Fig. 10 is a fragmentary detail, similar to a portion of Fig. 2, showing a deflector shield in position;

Fig. 11 is a section taken on the line 11—11 of Fig. 10;

Fig. 12 is a horizontal section, similar to Fig. 1, illustrating a further embodiment of the invention; and Fig. 13 is a longitudinal section taken on the line 13—13 of Fig. 2 but on a larger scale, showing the construction of the spray gun.

Referring to the drawings more in detail the apparatus is illustrated as comprising a stationary housing having end walls 10 and 11, side walls 12 forming hinged thereto top walls 13 and inclined bottom walls 14 (Figs. 1 to 3). The side and bottom walls, shown in this embodiment as integral, are secured between the end walls 10, 11 and the hinged top walls 13 seat between the end walls to form a tight seal. The housing is shown as somewhat pear-shaped in section with the bottom walls sloping downwardly to a central sump 15 and joining the side walls in a smooth curve that eliminates corners where spray could collect and also provides a smooth continuous surface over which the oversprayed material which is caught on the walls flows along the surface of the walls to the sump 15.

The top walls 13 are inclined at a steep angle and meet at a point at the center line of the housing. The slope of the top walls should be such that the oversprayed material which impinges on or is caught by the top walls flows downwardly along the under surface of such walls to the side walls instead of dropping off at the top walls onto the articles being sprayed. The angle depends upon the viscosity of the sprayed material, being steeper for more viscous materials. In general an angle of 45° or more with the horizontal is required. Angles of 45° to 60° are satisfactory for most spray materials.

The top walls 13 are hinged to the side walls 12 by means shown as hinges 16 which are designed to form a tight closure. Drain shields 21 are provided to provide a seal at the hinge joint. The bottom walls 14 also slope toward the sump 15 in longitudinal sections as shown in Fig. 2. A drain pipe 17 is connected to drain the spray material from the sump 15 to a receiver (not shown) for reuse.

The top walls 15 are provided at their ends with sealing flanges 18 and at their top edges with longitudinal stiffening members 19 to which handles 20 are attached for normal opening of the walls to provide access to the interior of the housing.

The bottom and side walls are shown as provided with jackets 22 for a heating or cooling medium, such as hot or cold air. The top walls are also provided with jackets 23. Inlet ports 24 are shown at the lower portion of the jackets 22 and outlet ports 25 at the upper end of the jackets 23. The jackets 22 and 23 are joined by a flexible hose 26 connecting ports 27 and 28 in the respective walls to provide for the passage of the medium from the inlet ports 24 through jackets 22 and 23 to the outlet ports 25. The direction of flow can, of course, be reversed, or the jackets may be fed independently. In some instances one or the other of the jackets may not be required. The walls, however, should in some cases be kept at a temperature suited to condense the solvent without causing water vapor to condense on the walls and should not be heated to a point that would tend to cause evaporation of the solvent in the solvent vapor pressure of the spray zone.

The end walls 10, 11 are formed with openings 30, 31 respectively for the passage of the articles to be sprayed. These openings have inclined top edges 32, 33 respectively along which drain gutters 34, 35 respectively are provided to prevent spray material from draining onto the articles as they pass through these openings.

Vestibules 36 are disposed in alignment with openings 30 and 31 to shield the same and prevent passage of the spray through the openings. The vestibules are formed by curved side and top walls 38, shown as integral, and sloping bottom walls 40. The top walls of the vestibules have a slope similar to that of the top walls 14 and curve gradually into the side walls. Bottom walls 40 slope toward central channels 42 respectively having bottoms 44 which slope toward the end walls 10, 11 so as to drain collected spray material into the housing. The openings 30, 31 are of the same shape as the walls of the vestibules so as to form a continuous passage for the articles.

The top and side walls 38 of the vestibules are shown as separate from the bottom walls 40, and as provided with flanges 47, to seat on the walls 40 and provide a drain shield to prevent leakage of spray material. The walls 38 and 40 are shown as having jackets 48, 49 respectively connected by flexible pipes 50 and having inlet port 51 and outlet ports 52 for heating or cooling fluid.

The outer end of the vestibule 36 at the entrance side is provided with doors 55, hinged at 56 to the side walls 39 to swing inwardly to permit passage of the articles to be sprayed and held by springs 53 in closed position.

The vestibule 36 at the exit side may be provided with similar doors arranged to swing outwardly. Generally, however, if the spray is directed away from the exit side, the exit vestibule can be left open without appreciable loss of solvent. To prevent direct passage of spray through the open exit vestibule an end closure 57 is provided having an opening closely fitting the articles so as to minimize the open area and is provided with a shield 58 extending inwardly a short distance from the open end over the path of the articles and provided at its end with an upturned lip 59, as shown in Figs. 1 and 2. The shield 58 is provided with sloping sides similar to the top walls above described and the opening in the closure 57 may be similarly shaped.

A conveyor chain 60 supported on track 66 extends through the housing and through the vestibules in the channels 42 and is provided with upstanding pins 61 having brackets 62 thereon shaped to carry the articles to be sprayed. The articles are illustrated as semi-cylindrical members 63 having semicircular front walls 64 and open at their rear ends. Such articles are shown merely by way of example. The pins 61 are also provided with crossbars 65 which engage and open the doors 55 for the passage of the articles 63. The doors are held open by the articles themselves and close when no articles are passing therethrough.

The track 66 is supported on brackets 67 which are carried by a base 68 on which the end walls 10, 11 are also supported.

The end wall 11 is provided with a plurality of openings 70 to receive spray guns 71 and to permit the number and location of the guns to be varied as desired. In Figs. 1 to 3 guns 71 are disposed in two of the openings 70 and the other openings are closed by plates 72, secured by bolts 73. The guns 71 are carried in diaphragms 74 which are secured over the selected openings and form supports for the guns and seals for the housing.

The two guns 71 of Fig. 1 are disposed on opposite sides of the conveyor and direct sprays along paths 76 which converge on the articles carried by the conveyor and are directed slightly toward the entrance end of the housing so as to avoid passing direct spray through the vestibule at the exit end, thereby minimizing loss of spray and solvent through the opening at the exit end of the vestibule. The spray from the two guns 71 is deflected toward the entrance end of the housing by interaction of the two sprays and by contact with the articles. In addition to the direct spray, a fog or mist is formed which fills the entire housing and contacts and coats the articles on all sides as they pass therethrough.

Sloping shields 77 (Figs. 10 and 11) are attached to the end wall 11, by flanges 78 and bolts 79, in a position to shield the non-spraying side of the guns 71 from air currents in the spray zone and to control the air currents which effect the functioning of the spray gun.

The construction of the spray guns 71 is shown in detail in Fig. 13 wherein a fixed housing 80 is formed with an internal bore 81 in which a hollow shaft 82 is journalled by ball bearings 83 and 84. The hollow shaft 82 carries a rotary case 85 having an outer flange 86 forming an annular channel 87 adapted to receive the spray material and to cause the material to form an annular film in the channel 87 due to centrifugal action as the case 85 is rotated at high speed. The flange 86 has a central opening 88 through which the spray passes and a sharp edge 89 for confining the spray to a well defined path. The case 85 is shown as made in two parts bolted together by bolts 90 with an annular lip 91 to cause the material to flow into the channel 87. It may, however, be made in one piece if desired.

The outer surface of the housing 80 is shown as provided with annular grooves 92 and the case 85 carries an annular flange 93 having a surface 94 which extends over the grooves 92 to form a liquid seal and with a cone-shaped outer surface 95 to throw outwardly any spray material that sticks or settles on the same. The flange 93 is also secured by the bolts 90.

The housing 80 is formed with an enlarged end flange 98 to which a gear case 99 is bolted by bolts 100. One end of the shaft 82 projects into the gear case 99 and carries a gear 101 which is secured by a nut 102. The gear 101 meshes with a gear 103 carried on a shaft 104 which is journaled by ball bearings 105 in a bushing 106. This bushing is held in a boss 107 in a wall 108 of the gear case by set screws 109. The end of the shaft 104 projects into a coupling 110 and is adapted to be coupled to a driving shaft such as a flexible cable 111 by which the rotary case 85 is driven.

A stationary shaft 112 extends through the hollow shaft 82 and through a boss 113 in the wall 108. The stationary shaft 112 is clamped in the boss 113 by a flange 114 on the shaft 112 and a nut 115 threaded onto the shaft 112.

A bracket 115 is attached to the end of the shaft 112 within the rotary case 85 and is attached by a screw 116. The bracket 115 carries a hollow stud 117 in which the hub 118 of a distributor 119 is journaled by ball bearings 120. The distributor 119 is formed with a cone shaped flange 120 carrying fins 121 terminating in a conical surface and with an inner flange 122 extending over the stud 117 to shield the same from the spray. A pin 123 secures the distributor 119 to the hub 118 and is arranged to permit removal or replacement of the distributor.

The fins 121 are positioned to dip into the peripheral film of spray material in the channel 87 and are driven thereby to pick up material from the advancing film and to discharge the same as a fine spray. The distributor is mounted with its axis inclined to the axis of the case 85 so that the fins 121 rotate in a plane which extends through the central opening in the case 85. Hence a portion of the spray from the distributor passes through this opening and the remainder is intercepted by the walls of the case 85 and returned to the peripheral film therein for respraying. In this way all of the material fed to the case 85 is eventually sprayed outwardly in a directed confined spray path. The axis of the distributor may also be tilted with respect to the diametrical plane through the case which contains such distributor so that the peripheral edges of the fins 121 intercept the film in the case 85 at an angle to the direction of movement of the film at the point of interception so as to avoid forming grooved areas in said film and also so as to agitate the film and prevent stratification thereof due to centrifugal separation.

The stationary shaft 112 is formed with an axial bore 125 communicating with radial bore 126 in the bracket 115 which in turn communicates with a bore 127 opening at 129 into the case 85 opposite an annular groove 129 therein for feeding spray material to the case 85. A coupling 130 is provided on the end of the stationary shaft 112 to receive a hose or pipe 131 carrying spray material under a pressure to force the same through said bores into the rotary case 85. A flange 132 and groove 133 on the bracket 115 and in the case 85 provide a seal to permit spray material entering the space between the stationary shaft 112 and the hollow shaft 82.

In Fig. 1 the housing 80 of the spray gun 71 is secured to the diaphragm 74 by clamps 134.

In the form shown in Fig. 6 the gun 71 is mounted in a flexible diaphragm 138 secured to the wall 11 by thumb nuts 139. The diaphragm 138 permits easy adjustment of the angle and position of the gun. The gun is shown in Fig. 6 as mounted in a boss 140 of a bracket 141 having a split clamp 142 which is clamped to a pin 143. The pin 143 is mounted on a rod 144 held in a bracket 145 for rotational and axial adjustment. The bracket 145 is attached to a base 68. The axes of the bore 140, the pin 143 and the rod 144 are all at right angles to each other so that universal adjustment of the spray gun is obtained.

Figs. 7, 8 and 9 illustrate an embodiment wherein louvers 150 are mounted beneath the top walls 38 and are inclined to catch any drip from the top walls and discharge the same along the walls so as to prevent the drip from reaching the articles being sprayed. Such louvers may be used in the embodiment of Figs. 1 to 3 if desired. Closures 57 may be provided with short drain lips 146.

The embodiment of Fig. 12 is similar to that of Figs. 1 to 3 except that spray guns 71 are mounted in both the wall 10 and the wall 11 and the spray is directed therefrom so as to strike both the leading end and the trailing end of the articles which are shown as having a rear wall 151. In this embodiment each gun 71 is located on the direct path of the spray from the other gun. However, since all external parts of the guns are rotating the spray cannot accumulate thereon and spatter and the operation is not interfered with by any spray that may be directed thereon. In Fig. 12 the gun 71 is shown as mounted at an angle in inclined walls 152 of supporting cups 153 which are attached to the end walls 10 and 11. The spray angle can be adjusted by rotating the cups 153. The construction of the apparatus of Fig. 12 is otherwise the same as that of Figs. 1 to 3.

It is also to be understood that the conveyor may be arranged to insert and remove the article through the same end of the housing in which case the other end can be completely closed. Also the pins 61 may be rotated by well known means as they advance through the spray zone so as to turn the article for uniform spraying on all sides.

The apparatus may be used for applying various types of sprayable material such as paint, varnish, lacquer, glaze for ceramics, or sand for sand blasting a surface. It is particularly useful for materials such as paint in a vaporizable solvent or carrier because the closed spray zone permits a solvent vapor equilibrium to be maintained which prevents evaporation of the solvent and the consequent thickening of the spray particles in the spray zone.

*Operation*

In the operation of this apparatus the sprayable material, such as paint, is fed through the pipe 131 and the bore 125 in the stationary shaft 112 into the rotating case 85 of the spray guns 71 where it forms an annular film in the channel 87 from which it is picked up and discharged as an atomized spray by the fins 121 of the distributor 119 which is driven at high speed by the rotating film into which it dips. The spray is thus thrown out of the opening 88 in the rotating case 85 along a well defined path. The spray from the distributor which is intercepted by the case 85 returns to the peripheral film for respraying until all of the material fed to the case has been sprayed into the spray zone.

The articles 63 to be sprayed are advanced through the spray zone in the housing by the conveyor 60. The vestibules 36 provide means for shielding the openings 30, 31 in the end walls 10, 11 so as to minimize the open area and form a substantially closed spray zone. The entrance vestibule is provided with doors 55 which are normally closed but open inwardly to allow the articles to pass. If the articles are of uniform shape, as in the case of pipe, the doors may be replaced by a closure plate having an opening of a size to pass the pipe with minimum clearance.

The exit vestibule may have similar doors although in the form shown the spray is directed away from the vestibule and a shield 58 is provided to prevent direct passage of spray.

The top walls 14 of the housing and the top walls 38 of the vestibules are sloped at an angle such that any spray which is caught thereon flows along the sloping under surfaces of the walls and is thus prevented from dripping onto the articles in the spray zone.

The walls of the housing and of the vestibules are jacketed for heating when hot spray or hot melt materials are used or for cooling when it is desirable to condense solvent vapor which would otherwise create excessive vapor pressure in the compartment. This solvent vapor by condensing on the walls aids drainage of material to the sump and can be controlled to cause an increase in spray particle viscosity when desirable, before the particles strike the work. The distance from each spray gun to the nearest opening in said housing should be at least equal to the average width of said housing so as to minimize the tendency of direct spray to pass through said opening.

What is claimed is:

1. Apparatus for spraying articles, comprising stationary walls including end and top walls forming a housing enclosing a spray zone which is closed except for an opening to pass the articles to be sprayed, conveyor means conveying articles through said opening into said spray zone, spray means in said housing discharging a spray of material onto said articles as they advance through said spray zone, all exposed stationary surfaces above the path of said articles, including said top walls, sloping at an angle of at least 45 degrees with their entire lower edges disposed beyond the path of said articles so that spray material which is intercepted thereby flows along the sloping surface and is discharged beyond the path of said articles.

2. Apparatus for spraying articles, comprising stationary walls including end and top walls forming a housing enclosing a spray zone which is closed except for an opening to pass the articles to be sprayed, conveyor means conveying articles through said opening into said spray zone, a rotary spray distributor discharging a spray of material centrifugally from its periphery onto said articles as they advance through said spray zone and having all exposed surfaces rotating to prevent the collection and dripping or spattering of spray material therefrom onto said articles, all exposed stationary surfaces above the path of said articles, including said top walls, sloping at an angle of at least 45 degrees with their entire lower edges disposed beyond the path of said articles so that spray material which is intercepted thereby flows along the sloping surface and is discharged beyond the path of said articles.

3. Apparatus for spraying articles, comprising stationary walls including end and top walls forming a housing enclosing a spray zone which is closed except for an opening to pass the articles to be sprayed, stationary walls forming a vestibule communicating with said opening, conveyor means conveying articles through said vestibule into said spray zone, spray means in said housing discharging a spray of material onto said articles as they advance through said spray zone, all exposed stationary surfaces above the path of said articles in said vestibule and in said spray zone, including said top walls, sloping at an angle of at least 45 degrees with their entire lower edges disposed beyond the path of said articles so that spray material which is intercepted thereby flows along the sloping surface and is discharged beyond the path of said articles.

4. Apparatus for spraying articles, comprising stationary walls including end and top walls forming a housing enclosing a spray zone which is closed except for entrance and exit openings in the respective end walls for the articles to be sprayed, stationary walls including top walls forming vestibules communicating with the respective openings, conveyor means conveying said articles through said vestibules and through said spray zone, spray means in said housing discharging a spray of material onto said articles as they advance through said spray zone, all exposed stationary surfaces above the path of said articles in said housing and in said vestibules, including said top walls, sloping at an angle of at least 45 degrees with their entire lower edges disposed beyond the path of said articles so that spray material which is intercepted thereby flows along the sloping surface and is discharged beyond the path of said articles, and movable closure flaps at the entrance end of said entrance vestibule, said flaps being adapted to flex about substantially vertical axes disposed beyond the path of said articles whereby dripping from the flaps onto the articles as they pass therethrough is prevented.

5. Apparatus for spraying articles, comprising stationary walls including end and top walls forming a housing enclosing a spray zone which is closed except for entrance and exit openings in the respective end walls for the articles to be sprayed, stationary walls including top walls forming vestibules communicating with the respective openings, conveyor means conveying said articles through said vestibules and through said spray zone, spray means in said housing discharging a spray of material onto said articles as they advance through said spray zone, all exposed stationary surfaces above the path of said articles in said housing and in said vestibules, including said top walls, sloping at an angle of at least 45 degrees with their entire lower edges disposed beyond the path of said articles so that spray material which is intercepted thereby flows along the sloping surface and is discharged beyond the path of said articles, said exit vestibule having an end plate having an opening disposed around and closely spaced from the articles to thereby reduce the open area.

References Cited in the file of this patent

UNITED STATES PATENTS

| | | |
|---|---|---|
| 1,339,529 | Verhoogen | May 11, 1920 |
| 2,130,225 | Bright | Sept. 13, 1938 |
| 2,201,991 | Dennison | May 28, 1940 |
| 2,400,315 | Paasche | May 14, 1946 |
| 2,587,514 | Norris | Feb. 26, 1952 |
| 2,597,021 | Norris | May 20, 1952 |
| 2,643,636 | Bauer | June 30, 1953 |